United States Patent

[11] 3,614,319

[72] Inventors Robert E. Krallinger; Edward G. Keplinger; Jerry W. Terrell, all of New Milford, Conn.

[21] Appl. No. 801,708

[22] Filed Feb. 24, 1969

[45] Patented Oct. 19, 1971

[73] Assignee Graphic Sciences, Inc. Danbury, Conn.

[54] TELEPHONIC TRANSMISSION OF DATA IN GRAPHIC FORM

17 Claims, 2 Drawing Figs.

[52] U.S. Cl. .......... 178/69.5 F, 179/4

[51] Int. Cl. .......... H04n 1/36

[50] Field of Search .......... 179/4, 2 DP; 178/69.5 F

[56] References Cited

UNITED STATES PATENTS

| | | | |
|---|---|---|---|
| 3,006,999 | 10/1961 | Mason | 179/4 |
| 3,084,213 | 4/1963 | Lemelson | 179/4 |
| 3,428,749 | 2/1969 | Gray | 179/4 |
| 3,441,665 | 4/1967 | Wuensch | 179/4 |

*Primary Examiner*—Richard Murray

*Assistant Examiner*—Peter M. Pecori

*Attorney*—Cesari and McKenna

ABSTRACT: A facsimile transmission system includes an automatic signalling arrangement in which the station at one end of the line transmits an initiating signal and the other station responds with a reply signal. After a predetermined interval following the end of the reply signal, the transmitter sends a start signal which begins document scanning at the transmitting station and facsimile printing at the receiving station. The start signal is used by both stations as a reference for synchronizing their respective operations.

During transmission of the document, the operator at the receiving station can interrupt the process by resuming transmission of the reply signal, the transmitter responding to this signal, by turning off. Similarly, the receiver responds to an interruption in the received signal by turning off, thereby providing the operators at both ends of the line with a means for rapidly signaling each other if the transmission is to end prematurely.

INVENTORS
ROBERT E. KRALLINGER
EDWARD J. KEPLINGER
JERRY W. TERRELL

BY Blair, Cesari & St. Onge
ATTORNEYS

INVENTORS
ROBERT E. KRALLINGER
EDWARD J. KEPLINGER
JERRY W. TERRELL
BY
*Blair, Cesari & St. Onge*
ATTORNEYS

TELEPHONIC TRANSMISSION OF DATA IN GRAPHIC FORM

BACKGROUND OF THE INVENTION

1. Field of the Invention

This invention relates to a facsimile transmission system. More specifically, it relates to an arrangement by which a facsimile transmitter and receiver automatically check the suitability of transmission conditions and then develop internal start signals that synchronize the document scanning and printing operations. 2. Description of the Prior Art A facsimile system of the type to which the invention is directed comprises a transmitter that scans an original document point-by-point and transmits an electric signal representing the tone (lightness or darkness) of the document at successive points. A receiver at the other end of the line includes a printer that sweeps over a printing medium in synchronism with the scanning operation at the transmitter. In response to the signals from the transmitter, the printer imparts to successive points on the printing medium the tones of the corresponding points in the original document.

Ordinarily, the document and the reproduction are mounted on rotating drums. The points along a line on the document thus pass in succession beneath a scanner positioned adjacent to the transmitter drum. At the same time, the corresponding points on the reproduction pass beneath a printing stylus in the receiver. The scanner and printing stylus move longitudinally along the respective drums so that after each line has been scanned and printed they repeat these operations on the next line, with successive lines being reproduced until a facsimile of the entire document has been printed at the receiver.

In a system of this type the drums must run at the same speed and, furthermore, they must be close to the same angle. If the speeds differ, the facsimile will be skewed with respect to the original. If the drums are at different angles, the reproduction will be displaced with respect to the original. With a slight difference in angles, this is no problem, since it merely moves the content of the reproduction toward one margin or the other. If this difference is too great, however, part of the content of the original will be displaced beyond one edge of the reproducing medium and thereby lost.

In some facsimile systems synchronism is provided by transmitting from one station to the other a tone that with suitable amplification powers synchronous motors driving the drums. This ensures equal drum speed. Also, index signals are transmitted to indicate the beginning or end of each line so that the receiver may control the position of its drum to make an edge of the reproduction coincide with these signals.

However, these systems generally make use of relatively high quality communication links. For example, when the telephone system is used as a transmission medium, specially conditioned lines are employed so as to provide a relatively large bandwidth and a low noise level. The present invention, on the other hand, is directed to a system which uses a conventional telephone line as the transmission medium. These lines have a relatively narrow bandwidth, and they are subject to relatively high noise levels and a relatively high degree of distortion, all of which may vary from line to line. Moreover, the signals are coupled into and out of the telephone system by means of acoustical coupling with the telephone handsets or by means of magnetic coupling, both of which introduce further limitations on transmission efficiency and reliability. Thus, it is highly desirable to avoid the use of continuing synchronizing signals.

Therefore, it has been proposed that initiating signals be transmitted at the outset, with the transmitter and receiver beginning operation in response to these signals. The transmitter then sends a succession of index signals corresponding with the beginnings of successive lines in the scanning and printing operations. The receiver adjusts the angular position of its printing unit in accordance with these signals. After the system has synchronized itself in this fashion, it proceeds with transmission of contents of the document to be reproduced.

This arrangement is complicated by the normal procedure followed in the use of these machines. The operators at both ends of the line normally begin by conversing with each other over the telephone handsets. They then place their handsets into acoustical or magnetic couplers and switch the facsimile transmitter and receiver into operation. In order for the initiating signals to provide their assigned functions, both the transmitter and receiver must be switched on and coupled to their associated telephone handsets. For example, if the operator whose machine is to receive these initial signals is a little late, the transmitter might begin to transmit the contents of a document without the receiver having started. This is not an unlikely occurrence with machines that are intended for use by relatively unskilled operators having a minimum of instruction. Moreover, the time required for synchronization is longer than one would desire.

OBJECTS OF THE INVENTION

An object of the present invention is to provide a facsimile system having automatic initiation of document transmission and reception.

Another object of the invention is to provide a system of the above type in which the transmitter and receiver automatically begin operation in rough synchronism with each other.

Another object is to provide a system of the above type that is capable of rapid synchronization.

A further object of the invention is to provide a system of the above type that automatically checks the communications link between the transmitter and receiver before commencing transmission of the document.

Another object of the invention is to provide a system of the above type that signals the operator when there is an interruption in document transmission.

Yet another object is to provide a system of the above type that provides for the transmission of a signal from the receiver to the transmitter to interrupt operation of the transmitter in cases of trouble.

A still further object of the invention is to provide a system of the above type that can be packaged in a portable unit adapted for both transmission and reception and is operable by relatively unskilled personnel.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings, in which.

BRIEF SUMMARY OF THE INVENTION

A facsimile system embodying the invention includes a transmitter that transmits a continuing initiating signal to the receiver over the intervening communications link. When the receiver senses this signal, it returns a reply signal, both signals being in the form of tones within the bandwidth of the system. The transmitter thereupon responds by turning off its initiating signal, and when the receiver senses this, it turns off its reply signal. Both units are now ready to commence operation. The transmitter then transmits its signal once again, and within a short, predetermined interval, both the receiver and transmitter start internal clocks running. The drums in the transmitter and receiver are then synchronized with these clocks. Since the clocks are almost in step with each other, the differences in drum angles is so small that the facsimile printed by the receiver will not run off the edge of the recording medium.

Moreover, with the foregoing signaling arrangement the transmitter and receiver need not be turned on in any particular order.

As another feature of the system, the receiver turns itself off if the information-bearing signal from the transmitter ceases for more than a predetermined interval during the transmission of a document. This signals the receiver that something is amiss. The receiver automatically sends back to the transmitter a tone that turns the transmitter off, thereby signaling the operator of the transmitter and also saving the telephone time that would otherwise be wasted in a useless transmission.

SPECIFIC DESCRIPTION OF THE INVENTION

Figure 1:
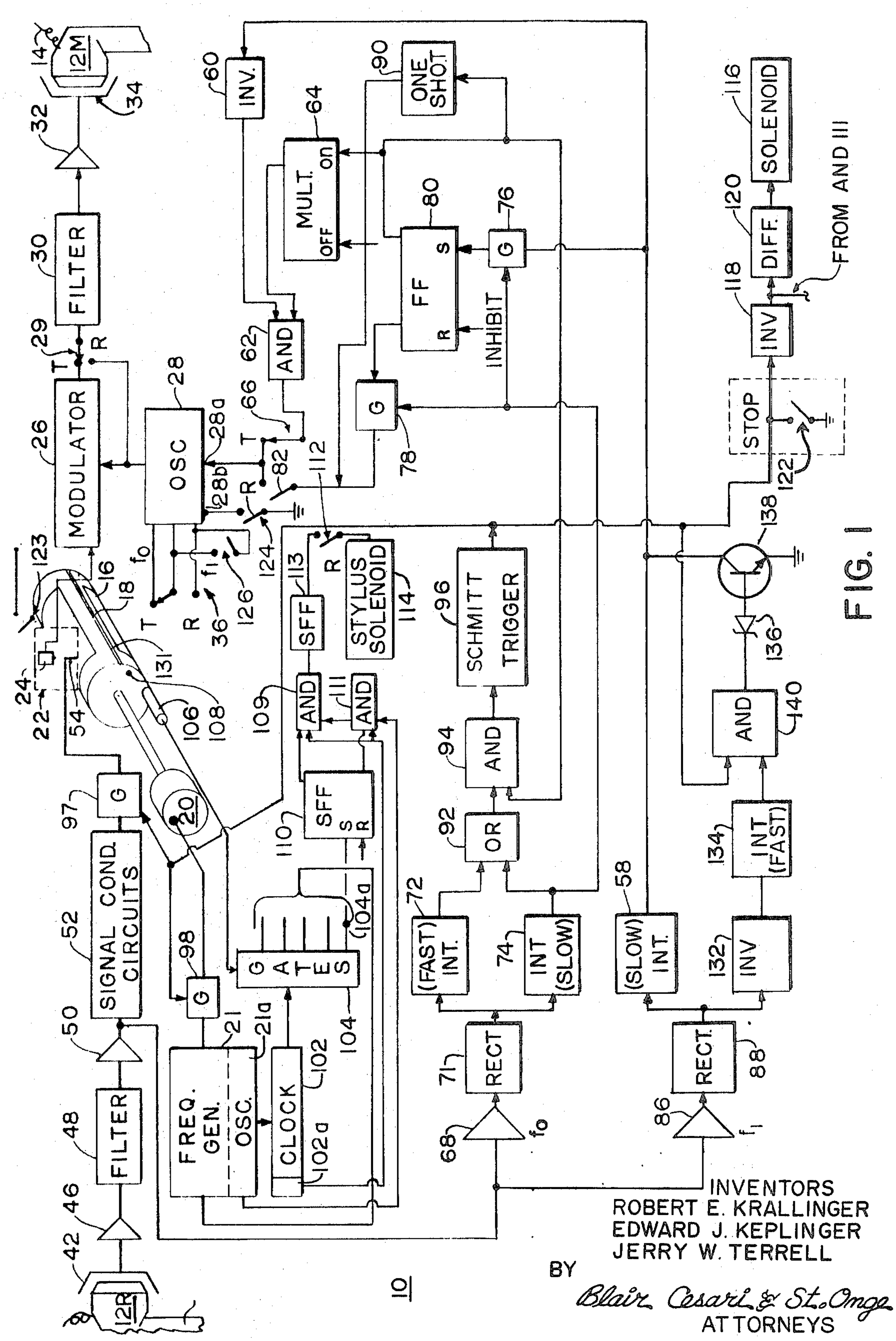
FIG. 1 is a schematic diagram of a facsimile transceiver embodying the invention and connected for operation as a transmitter.

FIG. 1 illustrates a facsimile transceiver 10, embodying the invention, acoustically coupled to the receiver 12R of a telephone handset 12 and also to the microphone 12M of the handset. The transceiver 10 is arranged to transmit over a telephone interconnection 14 information signals corresponding to the contents of a document 16 mounted on a drum 18. The drum 18 is rotated by a synchronous motor 20 powered by a frequency generator 21. A head 22 contains a scanner 24 that scans a narrow line along the document 16 as the drum surface rotates past the head. A suitable traversing mechanism (not shown) moves the head in the longitudinal direction so that the scanner 24 scans successive adjacent lines on succeeding rotations of the drum 18.

Thus, the scanner 24 develops an information signal corresponding to the tones of successive points on the document 16. A modulator 26 modulates the output of an oscillator 28 in accordance with the information signal. The modulated carrier is passed through a switch 29 and a filter 30 to an amplifier 32. The output of the amplifier drives a loudspeaker 34 in close proximity to the handset microphone 12M, thereby coupling the information signal into the handset 12 and onto the telephone connection 14.

When the transceiver 10 is arranged for document transmission as in FIG. 1, the switch 29 is in its "transmit" (T) position as shown. So, also, is a switch 36 which controls the frequency of the oscillator 28, thereby causing the oscillator to operate at the information carrier frequency $f_o$. The switches 29 and 36 and other "T" and "R" switches discussed below are mechanically coupled so that one may set them up for transmission or reception by depressing either a "transmit" button or a "receive" button. A conventional latching arrangement then maintains the actuated switch in the position to which it is set until the latch is released by actuation of a "stop" button, or automatically as described below.

Figure 2:
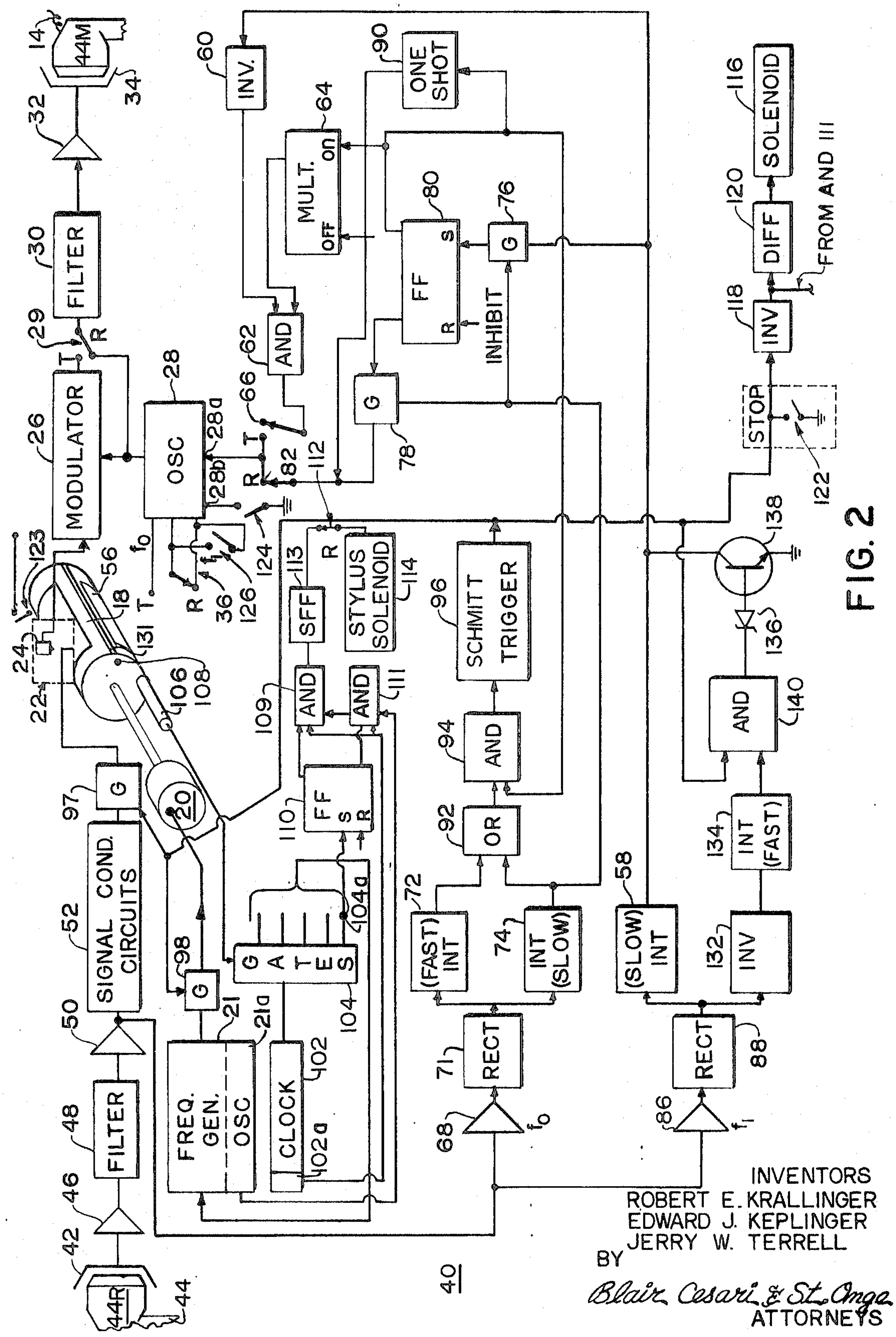
FIG. 2 is a schematic diagram of the transceiver when connected to function as a receiver.

FIG. 2 illustrates a transceiver 40, identical with the transceiver 10, arranged to print a facsimile of the document 16 (FIG. 1) in response to the signals received at the other end of the telephone connection 14. The transceiver 40 includes an input transducer 42 acoustically coupled to the receiver 44R of a handset 44 connected to the telephone line. The output of the transducer 42 is amplified by an amplifier 46 whose output in turn is passed through a filter 48 and then amplified by an amplifier 50. The signal from the amplifier 50 is passed through signal conditioning circuits 52 which include a demodulator, for example. The demodulated signal is then applied to a printing stylus 54 in the head 22 to convert the information signals into visual form on a facsimile sheet 56 affixed to the drum 18.

By way of example, the sheet 56 may be of an electrosensitive material which is normally white and darkens at points where electric current is passed through it, the degree of darkening corresponding with the amount of current. The stylus contacts the sheet 56 so as to pass current through it in accordance with the information signals received from the transceiver 10 (FIG. 1). The drum 18 in the transceiver 40 is rotated by the motor 20 therein in synchronism with the drum 18 in the transceiver 10, so that the points contacted by the stylus 22 correspond with the points scanned by the scanner 24 in the transceiver 10, and in this fashion the transceiver 40 prints on the sheet 56 a facsimile of the document 16.

The various elements in the information signal path, i.e. scanner, modulator, signal conditioning circuits, etc., are described in U.S. Pat. No. 3,392,232 and further refinements are described in the copending application of Krallinger et al., Ser. No. 785,495, filed Dec. 20, 1968 for AUTOMATIC GAIN CONTROL FOR GRAPHIC DATA TRANSMISSION SYSTEM.

To initiate operation of the system, the operators of the transceivers 10 and 40 place their telephone handsets 12 and 44 in enclosures (not shown) designed to maintain the handset transmitters and receivers in an acoustical coupling relationship with the loudspeakers 34 and input transducers 42. The operator of the transceiver 10 depresses his "transmit" button to close the "T" contacts of the various switches in his transceiver, and the operator of the transceiver 40 depresses his "receive" button to close the "R" contacts in the switches of his transceiver. When none of the buttons are depressed, a further set of switch contacts (not shown) ground the various integrators, as well as input terminals of the flip-flops and multivibrators in the transceivers, thereby resetting all of these elements. Thus, this reset condition exists at the time the buttons are depressed at the respective transceivers. Also, neither of the drum motors 20 is operating at this time.

Accordingly, at the transceiver 10 (FIG. 1) there is no output from an integrator 58, and the resulting output of an inverter 60 connected to the integrator 58 enables an AND circuit 62. The AND circuit thus passes the output of a free-running multivibrator 64 through a switch 66 to a keying terminal 28a of the oscillator 28. An input voltage at this terminal turns the oscillator on, and conversely, cessation of the input voltage turns the oscillator off. Thus, the oscillator turns on and off periodically in response to the output of the multivibrator 64 which illustratively may be arranged to have a duration of 3 seconds for each of its states. Accordingly, the transceiver 10 transmits over the telephone line a series of 3-second tones at the carrier frequency $f_O$.

At the transceiver 40 (FIG. 2) these tones are picked up from the handset 44 and applied from the amplifier 50 to a tuned amplifier 68. The output of the amplifier 68 is rectified by a rectifier 71 and the resulting signal is applied to a "fast" integrator 72 and a "slow" integrator 74. The integrators are actually averaging circuits comprising capacitors charged through series resistors and normally discharged through shunt resistances. Diodes may be included in the charging paths so as to prevent discharge through the series resistors and thereby provide discharge time constants that are longer than the charging time constants. This latter feature is desirable because the output of the rectifier 71 is in the form of pulses, and the relatively long discharge time constant permits relatively rapid charging of the integrators without discharging them during the intervals between pulses.

By way of example, the slow integrator 74 may have a charging time constant of 0.7 seconds and a normal discharge time constant of 2 seconds, while the fast integrator 72 has a charging time constant of 9 milliseconds, and a discharge time constant of 9 milliseconds.

After the slow integrator 74 has received an input for a sufficient length of time to be reasonably certain that the transceiver 40 has been receiving a signal from the transceiver 10, rather than merely noise on the telephone line, its output voltage will have risen to a point sufficient to inhibit a gate 76 and enable a gate 78. The gate 78 then passes the output of a flip-flop 80 to the oscillator keying terminal 28a by way of a switch 82. This turns on the oscillator 28, which operates at a frequency $f_1$ by virtue of the R position of the switch 36. With the switch 29 in its R position the output of the oscillator 28 is passed directly through the filter 30 to the amplifier 32 and then on to the telephone connection 14 by way of the loudspeaker 34 and handset 44. In this manner, the transceiver 40 generates a reply signal indicating that it has received the initiating signal from the transceiver 10.

Returning to FIG. 1, the transceiver 10 picks up the reply signal by way of the handset 12 and transducer 42. From the amplifier 50 the signal passes to an amplifier 86 turned to the frequency $f_1$ of the signal. The output of the amplifier 86 is rectified by a rectifier 88 and the resulting pulses from the rectifier are summed in the integrator 58. This integrator has a relatively long time constant like the integrator 74, so that it develops an output level only after a length of time sufficient to be reasonably certain that the reply signal has been received. When the output voltage of the integrator 58 rises to this level, the output of the inverter 60 drops, thereby disabling the AND circuit 62 and cutting off the multivibrator 64 from the oscillator keying terminal 28*a*. This turns off the oscillator 28.

In the meantime, the output of the oscillator 28 has been applied to the tuned amplifier 68 in the transceiver 10 by way of a "sidetone" or crosstalk in the telephone picked up by input transducer 42. Thus, the slow integrator 74 in the transceiver 10 has developed an output voltage sufficient to inhibit the gate 76 and thereby prevent the output of the integrator 58 from reaching the flip-flop 80. With the oscillator 28 now shut off, however, the output of the integrator 74 decays to the point where the gate 76 is no longer inhibited and the output of the integrator 58 is passed by this gate to set the flip-flop 80. This imposes the ON state on the multivibrator 64, i.e. the multivibrator now remains in the state which would cause the oscillator to operate if the AND circuit 62 were enabled.

Again turning to FIG. 2, cessation of the initiating signal from the transmitting transceiver 10 brings to an end the output of the tuned amplifier 68 in the transceiver 40. The output of the integrator 74 in this transceiver thus decays, thereby enabling the gate 76 and inhibiting the gate 78. The flip-flop 80 is thus cut off from the oscillator keying terminal 28*a*, thereby turning off the oscillator. However, in the meantime, the integrator 58 has been charged up by the output of amplifier 50, which has applied the transceiver 40's reply signal ($f_1$) to the tuned amplifier 86. Accordingly, the output of the integrator 58 is now passed by the gate 76 to set the flip-flop 80.

This triggers a one-shot multivibrator 90 whose output is applied to the terminal 28*a* by way of the switch 82. The oscillator 28 thus continues operation for the duration of the unstable state of the multivibrator 90, e.g. about 1 second. With this arrangement the interruption in the output of the oscillator 28 in response to cessation of the initiating signal ($f_o$) is of such brief duration that the voltages in the integrators 58 of both the transceivers 10 and 40 droop only slightly before the multivibrator 90 in the transceiver 40 restarts the oscillator. Thus, both transceivers continue operation as though there had been no interruption.

With further reference to the transceiver 10 of FIG. 1, when the reply signal from the transceiver 40 terminates, the output voltage of the integrator 58 decays and the output of the inverter 60 correspondingly increases. When the latter voltage reaches a level sufficient to enable the AND circuit 62, the AND circuit again passes the output of the multivibrator 64 to the switch 66 and oscillator terminal 28*a*. Since the multivibrator is now held in ON position, the oscillator 28 recommences transmission at the frequency $f_o$. This is a START signal from which both transceivers time their future operations.

More specifically, at each transceiver the START signal is sensed by means of the tuned amplifier 68, the rectifier 70 and the fast integrator 72. The output of the integrator 72 is passed by an OR circuit 92 to an AND circuit 94 which has been enabled by the setting of the flip-flop 80. Thus, when the output of the integrator 72 reaches the upper threshold level of a Schmitt trigger 96, the trigger changes state. It thereby generates an internal START signal that enables a gate 97 to pass the output of the signal conditioning circuits 52 in the receiving transceiver to the stylus 54 therein. This signal also enables a gate 98 to pass the output of the frequency generator 21 to the drum motor 20.

Both the drums 18 thus start turning immediately. Within a short time they are synchronized with the respective internal start signals as described below and the system then commences to transmit and print the facsimile in the manner described above.

The use of the fast integrator 72 in developing the internal START signals serve two purposes. In the first place, with a short integrating period, there is less likelihood of the reception of a noise spike which, if received at one transceiver and not at the other, would result in different output voltages in the two integrators and thereby delay one of the internal START signals with respect to the other. Also, with a short time constant, there will be a smaller absolute difference in integration times due to variation of circuit parameters within the assigned tolerances.

Thus, with an 11 millisecond time constant, differences between the two integrators resulting in a 40 percent difference in time constants will result in a 4.4 millisecond interval between the two internal START signals. With a drum rotation speed of 2.5 revolutions per second, this will cause the drums to be offset from each other by only 4°. With a longer time constant, this offset would be correspondingly greater, given the same tolerances on the integrator components.

The purpose of the multivibrators 64 and 90 is to make sure that the reply signal ($f_1$) is sensed by the transmitting transceiver 10. In some instances an echo suppressor on the telephone line may respond to the initiating signal by blocking transmission of signals in the reverse direction, i.e. from the transceiver 40 to the transceiver 10. This would prevent detection of the reply signal by the transceiver 10. By turning the oscillator 28 off periodically, the free-running multivibrator 64 provides a succession of intervals in which the transceiver 10 can detect the reply signal in spite of echo suppression.

If echo suppression blocks the reply signal, the oscillator 28 in the transceiver 10 will be turned off by the multivibrator 60 instead of by the reply signal. However, the transceiver 40 has no way to detect this difference, and when it senses termination of its input at the frequency $f_0$, it will shut off its oscillator 28 and set its flip-flop 80. Moreover, it may sense the end of the $f_0$ input before the transceiver 10 has detected the reply signal; in that case the transceiver 10 never will detect the reply signal and the system will not complete its startup procedure.

The one-shot multivibrator 90 in the transceiver 40 eliminates this problem by continuing the reply signal for a substantial interval after cessation of the $f_0$ input to that transceiver. This ensures that the transceiver 10 will detect the reply signal and then complete the start-up procedure in the manner described above.

Where echo suppression is no problem, the system may be simplified by eliminating the multivibrator 64 and making the initiating signal a continuous tone. There will then be no need to prolong the reply signal and the one-shot multivibrator 90 can therefore be eliminated also.

The drums 18 are synchronized with the respective internal START signals in the following manner. Each START signal resets a clock 102 which operates in accordance with the output of an oscillator 21*a* incorporated in the frequency generator 21. The clock has a period equal to the time for the drum 18 to make one revolution at the standard operating speed, i.e. 400 milliseconds in this example. During successive parts of this period it enables a succession of gates 104. The gates 104 are connected to pass the output of a sensor 106 that detects a reference mark 108 on the end of the drum 18. Which gate 104 will pass the output of the sensor 106 depends on when during the clock period the reference mark 108 passes by the sensor. The output of this gate is then used to alter the frequency of the generator 100 and thereby alter the speed of the drum motor 20.

By thus repetitively sensing the time at which the reference mark 108 passes the sensor 106, and accordingly altering the speed of the drum motor 20, the clock 102 and gates 104 eventually cause the reference mark 108 to pass the sensor 106 at the beginning of a clock period. An output terminal 104*a* of the gates 104 then passes the next sensor signal, which sets the frequency generator 100 to its standard speed. The angular position of the drum 18 is now what it would have been if the reference mark had passed the sensor 106 at the time of the internal START signal, with the drum turning at the standard speed.

With the drums 18 at both the transceivers 10 and 40 having been adjusted in this manner, the drums will differ in position only by the difference in timing of the two internal START signals. In this connection it should be noted that the oscillators 100a are crystal-controlled oscillators whose frequencies are carefully set so as to be very close to a predetermined standard frequency. Thus, the drums 18 will not only be set to approximately the same angular position when they are synchronized with the internal START signals, the difference in their angular positions will vary by an insignificant amount during the transmission and printing of the facsimile, thereby preventing skewing of the facsimile with respect to the original.

With the foregoing arrangement, the drums 18 will be synchronized within 5 seconds after the internal START signals. If one of the transceivers fails to attain synchronism by this time, there is probably a malfunction that will probably prevent synchronization. Therefore, we have included decision circuits that check for synchronism at the end of this interval and govern operation of the transceivers accordingly.

In each transceiver, the output signal at the terminal 104a sets a flip-flop 110 whose state therefore indicates synchronism or a lack of it. Also, a counter 102a connected to the last stage of the clock 102 counts the number of clock periods (i.e. drum revolutions) from the internal START signal. Assuming a four-stage binary counter 102a and a 400-millisecond clock period, the last stage of the counter 102a will change state 6.4 seconds after the internal START signal. The resulting output of this stage is applied to a "go" AND circuit 109 and a "no-go" AND circuit 111.

The set output of the flip-flop 110 is also applied to the AND circuit 109 and the reset output of the same flip-flop is applied to the AND circuit 111.

Accordingly, if the drum 18 has attained synchronism within 6.4 seconds after the internal START signal, the outputs of the counter 102a and the flip-flop 110 will enable the "go" AND circuit 109 to pass a pulse from the oscillator 21a. In the receiving transceiver 40 this pulse sets a flip-flop 113 whose resulting output is passed by a switch 112 to a solenoid 114 that brings the stylus 54 into contact with the facsimile 56.

If the drum 18 has not attained synchronism within the allotted time, the continued reset condition of the flip-flop 110 causes the "no-go" AND circuit 111 to pass the oscillator pulse. This pulse shuts down the transceiver as described below.

Since the information signal corresponding to the content of the document to be reproduced has a carrier at the same frequency $f_0$ as the initiating signal, there will be an output from the amplifiers 68 in both transceivers during the document transmission and reproduction process. (In the transceiver 10 this results from pickup by the input transducer 42 by virtue of the "sidetone" arrangement in the telephone instrument). At the receiving transceiver 40 (FIG. 2), an interruption in the information signal, which must be caused, for example, by degradation of the telephone connection, will result in termination of the output of the amplifier 68. The outputs of the integrators 72 and 74 will therefore decay, as will the output of the OR circuit 92 to which both integrators are connected. The Schmitt trigger 96 will then revert to its original state, thereby turning off the drum motor 20.

The change of state of the trigger 96 also results in the impulsing of a solenoid 116 by way of an inverter 118 and a differentiator 120. The solenoid 116 is arranged to release the latch holding down the "transmit" and "receive" button. Thus, in this case it releases the receive switches, thereby resetting the electrical system in the transceiver 40. This alerts the operator of the transceiver 40 that there has been a problem in transmission. He can then signal the operator of the transceiver 10 as described below, so that the entire operation can be brought to halt, thereby preventing the wastage of time that would otherwise result if the system continued on to the normal end of document transmission.

In this connection it should be noted that the connection of the slow integrator 74 to the OR circuit 92 prevents the cessation of transmission following very short interruptions in the received signal due, for example, to noise on the line which would not unduly degrade the quality of the facsimile being printed at the transceiver 40.

The same signalling arrangement also permits the operator of the transceiver 10 to signal the end of transmission prior to normal termination thereof. For example, he may be having mechanical difficulties, in which case he can actuate a pushbutton "stop" switch 122 that grounds the input to the inverter 118; this activates the solenoid 116 to reset the transmit switch and thereby turn off the transceiver 10. In response, the transceiver 40 will turn itself off as described above.

Moreover, in some cases there may be a short document or only part of a document to be transmitted. In that case a limit switch 123 can be set for engagement by the head 22 after the scanner 24 has traversed the desired distance along the drum 16. The limit switch 123 is connected so that when it is tripped it accomplishes the same function as the stop switch 122 in turning off the transceiver 10. The transceiver 40 responds by turning off also, and again this saves time that would otherwise be wasted in scanning the length of the maximum size document accommodated by the system.

The output of the "no-go" AND circuit 111 in each transceiver is applied to the differentiator 120 so as to shut down the transceiver when synchronism failure is detected as described above.

At any time after transmission of the information signal begins, the operator of the receiving transceiver 40 can stop operation of both transceivers and signal the operator of the transmitting transceiver 10 by actuating his stop switch 122. This stops the transceiver 40 in the manner described above. Also by means of switches 124 and 126 mechanically coupled to the switch 122, it turns on the oscillator 28 (through a second keying terminal 28b) and causes the oscillator to operate at the frequency $f_1$.

At the transmitting transceiver 10 (FIG. 1), reception of this STOP signal provides an output from the tuned amplifier 86 and a corresponding output from the integrator 58. The resulting drop in the outputs of the inverter 60 AND circuits 62 turns off the oscillator 28. Ultimately, this cessation of a signal at the frequency $f_0$ will cause the Schmitt trigger 96 at both transceivers to revert to their original state. At the transceiver 10 this turns off the drum motor 20 resets the "transmit" switches in the manner described above. A shutdown of the transceiver 10 in this manner signals the operator, who can then pick up the handset 12 for a discussion with the operator at the other end of the line.

In one embodiment of the system we have used a carrier frequency $f_0$ of 2050 Hz. and a receiver signalling frequency $f_1$ of 1520 Hz. Whenever the modulation applied to the carrier includes a component of 500 Hz. there will be a sideband component at the frequency $f_1$. Along with everything else transmitted by the transceiver 10, this component may be picked up by the transducer 42 in the same transceiver by virtue of the "sidetone" arrangement in the telephone instrument. Thus, it might charge up the integrator 58 and shut down the system. The data detection circuit about to be described prevents this from happening.

The drum 18 carries a black stripe 131. This stripe passes under the scanner 24 once during each revolution of the drum. During the interval that the stripe passes the scanner 24, the document tone sensed by the scanner is constant and therefore the only frequency component from the modulator 26 is the carrier frequency $f_o$.

Accordingly, during this interval there is no output from the tuned amplifier 86 and rectifier 88. An inverter 132 connected to the rectifier 88 therefore applies a charging current to an integrator 134 whose time constant is shorter than the interval during which the stripe 131 is sensed by the scanner 124. Thus, the integrator 134 charges up to a voltage greater than the breakdown voltage of a Zener diode 136, thereby causing a transistor 138 to conduct and discharge the integrator 58. The integrator 58 has a time constant substantially longer than the period of rotation of the drum 18, and, therefore, discharge of this integrator once every rotation prevents it from developing an output voltage sufficient to trigger the silicon-controlled rectifier 130. One the other hand, a stop signal from the receiving transceiver 40 will provide a tone at the frequency $f_1$ for a period in excess of the time constant of the integrator 58. The integrator will thus charge up without being discharged by operation of the integrator 134, inasmuch as the latter integrator does not charge up as long as there is an output from the amplifier 86.

The inverter 132 and integrator 134 preferably take the form of a circuit in which the integrator contains a capacitor that is continuously charged through a series resistor connected to a voltage source. A transistor is connected to discharge the capacitor whenever there is an appreciable instantaneous output voltage from the rectifier 88.

An AND circuit 140 enabled by the output of the Schmitt trigger 96 prevents functioning of the integrator 134 during the time in which the transceivers are exchanging signals prior to starting rotation of the drums 18.

It will be apparent that one may make numerous modifications in addition to those described above without departing from the scope of the invention. For example, the initiating signal might be sent from the receiving transceiver and the reply signal from the transmitting transceiver. The external START signal can be sent from either transceiver. Also, there is no need for the information signal carrier frequency to be used for one of the signals involved in the startup procedure. However, the illustrated arrangement is preferred, inasmuch as it combines functions of the various circuit elements. For example, by using the carrier frequency as the frequency of some of the control signals, we require only two frequencies for the oscillator 28. Moreover, the same circuit elements that detect initiating and START signals can then be used to detect cessation of the information signal by the receiving transceiver.

The signalling arrangement not only verifies the readiness of the transceivers and the communications link extending between them, it is readily operated by personnel having minimal skills. Moreover, it is fast and it brings the system to the point at which it can begin facsimile transmission within a relatively short time after operation is begun. At the same time, the signalling and control circuits avoid many of the problems caused by noise of various forms.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

We claim:

1. A facsimile transmission system of the type comprising (i) a transmitter unit arranged to scan a document and transmit information signals in the form of a modulated carrier corresponding to the contents of a document and (ii) a receiver unit arranged to print a facsimile of said document in response to said information signals, said system including A. means in a first one of said units for transmitting an initiating signal to the other unit, B. means in said other unit for sensing said initiating signal and returning a reply signal in response thereto, C. means at said first unit for sensing said reply signal and terminating said initiating signal in response thereto, D. means at said second unit for sensing the termination of said initiating signal, and E. means responsive to the termination of said initiating signal for generating an external signal for transmission from one of said units to the other, F. means in each unit for developing an internal start signal in response to said external start signal, and G. means in said units for synchronizing the motions involved in said scanning and printing with the respective internal start signals for simultaneous scanning at the transmitter and printing at the receiver.

2. The system defined in claim 1 including means at said receiver unit for indicating the cessation of said carrier at the receiver during the time when information signals are to be transmitted by said transmitter unit.

3. The system defined in claim 1 in which

A. said transmitter unit generates said external start signal,

B. said external start signal has the frequency of said carrier, and

C. including means at said transmitter unit and said receiver unit for 1. sensing the presence of a component at said carrier frequency in the output of said transmitter unit for developing said internal start signals, and 2. sensing the absence of said component after said internal start signals.

4. The system defined in claim 3 including means for turning off said receiver unit in response to said absence of said component.

5. The system defined in claim 3

A. in which said initiating signal has the frequency of said carrier, and

B. including means for inhibiting the generation of said internal start signals until after termination of said reply signal.

6. The system defined in claim 4

A. in which said initiating and external start signals have the same frequency, and B. including means for inhibiting said internal start signals until termination of said reply signal.

7. The system defined in claim 1 including

A. means at said receiver for transmitting a stop signal to said transmitter, and B. means at said transmitter for signalling to the operator thereof receipt of said stop signal.

8. The system defined in claim 1

A. in which said transmitting unit transmits said initiating signal and said receiving unit transmits said reply signal, B. including trouble-indicating means at said transmitting unit selectively responsive to a signal at the frequency of said reply signal for indicating the presence of a signal at that frequency for a predetermined interval, and C. means at said transmitter for inhibiting the indication by said trouble-indicating means until after the generation of said internal start signal in said transmitting unit.

9. The system defined in claim 1

A. in which said receiving unit transmits said reply signal,

B. in which the frequency of said reply signal is within the frequency band of said information signals, C. including trouble-indicating means at said transmitter selectively responsive to said frequency of said reply signal and arranged to provide a trouble indication when said reply signal persists for a predetermined interval, D. means for inhibiting generation of said trouble-indication until after said transmitting unit develops its internal start signal, E. further trouble-indication inhibiting means comprising 1. means at said transmitting unit for preventing transmission of an information signal component having said reply signal frequency during successive rest intervals whose period is less than said predetermined interval, and 2. means for resetting said trouble-indicating means when the input for said trouble-indicating means fails to contain said reply signal frequency for an interval at least as great as a reset interval.

10. The system defined in claim 1

A. in which said initiating signal is a tone that is periodically turned on and off, and B. said reply signal is a continuous tone.

11. The system defined in claim 10 in which said reply signal terminating means is arranged to turn off said reply signal a sufficient time after the termination of said initiating signal to substantially ensure detection of said reply signal at said first unit.

12. The system defined in claim 11 in which each of said units includes a synchronizing arrangement that constrains the movement involved in the scanning or printing at said unit to operate as through said movement had begun at a standard speed at the time of said internal start signal in that unit.

12. A facsimile transmission system of the type comprising (i) a transmitter unit arranged to scan a document by means of rotational and longitudinal movement of a scanner relative to said document and transmit information signals in the form of a modulated carrier corresponding to the output of said scanner, and (ii) a receiver unit arranged to print a facsimile of the document in response to said information signals by means of a printer that undergoes relative rotational and longitudinal movement relative to said facsimile, said movements being at a standard speed and in synchronism with each other, said system including A. means in a first one of said units for transmitting an initiating signal to the other unit,
B. means in said other unit for sensing said initiating signal and returning a reply signal in response thereto,
C. means for generating internal start signals in the respective units in response to the sensing of said reply signal, and
D. clock means in each of said units referenced to the respective internal start signals for synchronizing said scanner and printer movements with said internal start signals.

14. The system defined in claim 13 in which said synchronizing means constrain the position of said scanner and printer to the positions they would have had if they had been rotating at said standard speed and in a reference position at the time of the respective internal start signals.

15. A facsimile transmission system of the type comprising (i) a transmitter unit arranged to scan a document by means of rotational and longitudinal movement of a scanner relative to said document and transmit information signals in the form of a modulated carrier corresponding to the output of said scanner, and (ii) a receiver unit arranged to print a facsimile of said document in response to said information signals by means of a printer that undergoes relative rotational and longitudinal movement relative to said facsimile, said movements being at a standard speed and in synchronism with each other, said system comprising A. a transmitting circuit in each unit for transmitting signals to the other unit,
B. a receiving circuit in each unit for receiving signals from the other unit,
C. in said transmitting unit
  1. an oscillator connected to operate at said carrier frequency,
  2. means for periodically turning said oscillator on and off when said transmitting unit is turned on,
D. in each of said units a carrier detecting circuit for detecting the transmission of a signal on said carrier frequency by said transmitting unit, said carrier detecting circuit including
  1. a filter selectively passing signals at said carrier frequency,
  2. a fast carrier-frequency accumulator connected to accumulate the output of said first filter and develop an output corresponding to a relatively short term average value of the output of said first filter, 3. a slow carrier-frequency accumulator connected to accumulate the output of said first filter and develop an output corresponding to a relatively long term average value of the output of said first filter,
  4. coincidence circuits providing an output corresponding to the outputs of said carrier frequency accumulators when enabled by an enabling signal,
  5. a trigger circuit connected to provide an internal start signal when the output of said coincidence circuits increases above a predetermined level,
E. in said receiving unit an oscillator arranged to operate at a second frequency,
F. in each of said units a reply frequency detector connected to detect the transmission of a signal on said second frequency by said receiving unit, said reply frequency detector comprising
  1. a second filter selectively passing signals at said reply frequency.
  2. a reply frequency accumulator connected to accumulate the output of said second filter and develop a signal corresponding to the average of said second filter output over the time constant of said reply frequency accumulator,
G. in each unit
  1. a flip-flop, and
  2. a first gate connected to pass the output of said reply frequency accumulator to set said flip-flop, said first gate being inhibited by the output of said slow accumulator,
H. in said receiving unit a second gate connected to turn on said reply frequency oscillator on the coincidence of said output of said slow carrier-frequency accumulator and the reset condition of said flip-flop, whereby said receiving unit transmits said reply signal upon detection of the initial carrier frequency signal from said transmitting unit,
I. in said transmitting unit means for inhibiting the transmission of signals at said carrier frequency in response to the output of said reply frequency accumulator, whereby the outputs of said slow carrier-frequency accumulators in both units decrease so as to enable said first gate and thereby set said flip-flop,
J. in said transmitting unit the set condition of said flip-flop maintaining said oscillator on in the absence of the inhibiting of said oscillator output,
K. in each unit the set condition of said flip-flop providing said coincidence circuit enabling signal,
L. whereby in response to said reply signal there is a decrease in the output of said carrier frequency accumulators in both said units, said decrease inhibiting the transmission of said reply frequency signal by said receiving unit, thereby in turn providing a decrease in the output of said reply frequency accumulator in both said units and enabling the transmission on said carrier frequency by said transmitting unit, whereby shortly after the resumption of said carrier frequency transmission the fast carrier-frequency accumulator in each of said units provides an output causing the triggers to emit said internal start signals.

16. The system defined in claim 15 including means in said units for initiating the respective scanning and printing movements in response to the respective internal start signals.

17. The system defined in claim 16 including means at each of said units for synchronizing the scanning or printing movement therein by constraining the scanner or printer to the same position it would have had it been in a reference position and moving at said standard speed at the time of said internal start signal.